(12) United States Patent
McGrath et al.

(10) Patent No.: US 6,268,982 B1
(45) Date of Patent: Jul. 31, 2001

(54) COMBINATION LOAD RAMP AND UNLATCHING MECHANISM FOR A REMOVABLE DISK CARTRIDGE

(75) Inventors: Michael C. McGrath, Pleasanton; James D. Fahey, Farmington; David A. Taylor, Pleasanton, all of CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/368,634

(22) Filed: Aug. 5, 1999

(51) Int. Cl.[7] .............................. G11B 5/54; G11B 21/22; G11B 5/33; G11B 5/127
(52) U.S. Cl. ......................................... 360/254.7; 360/133
(58) Field of Search ................................. 360/254.7, 255, 360/255.6, 255.9, 133; 369/272

(56) References Cited

U.S. PATENT DOCUMENTS

| | | | |
|---|---|---|---|
| D. 410,644 | 6/1999 | Iftikar et al. | D14/121 |
| D. 411,533 | 6/1999 | Iftikar et al. | D14/121 |
| D. 411,991 | 7/1999 | Khuu | D14/114 |
| D. 414,763 | 10/1999 | Iftikar | D14/125 |
| 5,831,795 | 11/1998 | Ma et al. | 360/254.3 |
| 5,973,886 | 10/1999 | Khuu | 360/254.5 |
| 5,974,026 | 10/1999 | Guerini | 369/291 |

*Primary Examiner*—David L. Ometz
*Assistant Examiner*—Julie Anne Watko
(74) *Attorney, Agent, or Firm*—Woodcock Washburn Kurtz Mackiewicz & Norris LLP

(57) ABSTRACT

A latch system for a removable cartridge and disk drive is provided. The cartridge is hinged at the back so as to pivot apart about an axis that is perpendicular to an axis of rotation of the disk. A pair of latches are disposed on opposing sides of the cartridge outboard of a labyrinth seal. Each of the latches includes an upper and a lower protrusion that acts as a catch that are insertable into corresponding apertures in the cartridge. The latches a spring-loaded toward a closed position. A load ramp for loading and unloading heads is fixed in the drive and contacts and engages a first latch, and a second unlatching member is fixed in the drive and contacts and engages the second latch. Employing the load ramp to unlatch one side of the cartridge conserves space within the cartridge.

20 Claims, 11 Drawing Sheets

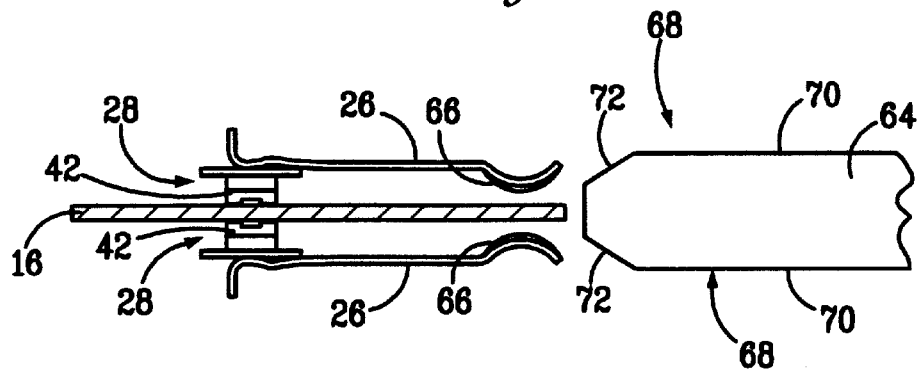
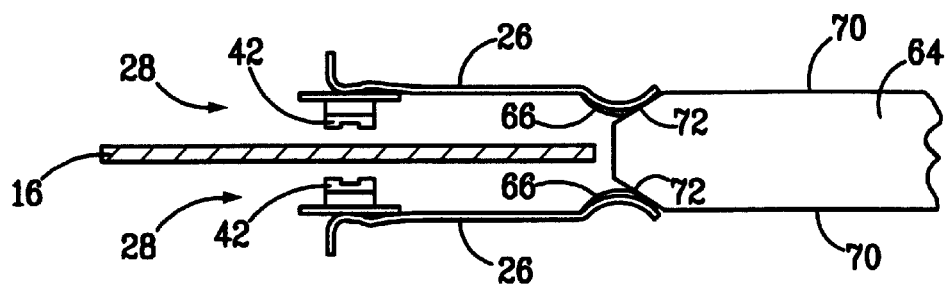
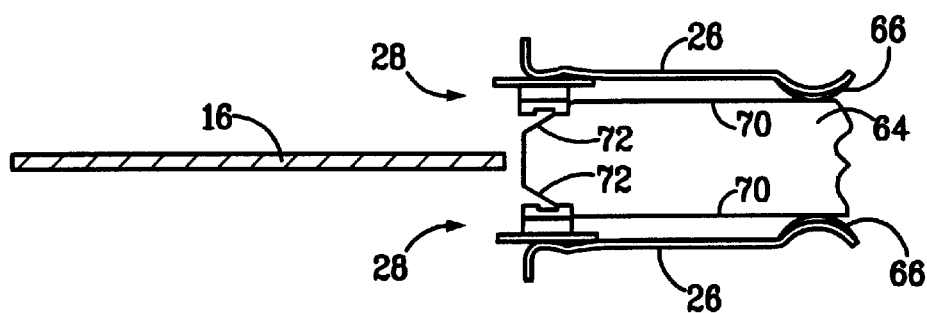

COMBINATION LOAD RAMP AND UNLATCHING MECHANISM FOR A REMOVABLE DISK CARTRIDGE

BACKGROUND OF THE INVENTION

This invention relates to disk drives that employ removable cartridges, and more specifically, to a load ramp that cooperates with an actuator to unload and load a read/write head that unlatches a removable cartridge.

Conventionally, a removable cartridge disk drive has an actuator upon which read/write heads are mounted for communicating with a disk. Actuators typically are of two types: linear or rotary. Linear actuators translate along an axis that is radial to the disk and aligned with a centerline of the actuator. Rotary actuators typically consist of a structural arm that pivots on a voice coil motor, and a suspension arm that extends from the structural arm opposite the voice coil motor. The heads are mounted to the end of the suspension arm distal from the voice coil motor.

Disk drives that employ removable disk cartridges commonly retract the actuator to disengage the heads from the disk surface before ejection of the cartridge from the drive to prevent damage to the heads and disk surface. Disk drives that employ nonremovable may also disengage the heads from the disk, especially with highly polished disks to which the heads may stick if left in motionless contact. A load ramp is typically disposed near the outer edge of the disk to facilitate loading (that is, moving the head onto the disk) and unloading (that is, moving the head off of the disk) of the heads. The load ramp may be disposed over the disk surface to lift/raise and support the suspension. Also, the load ramp may be disposed outside of the disk perimeter, in which case a lifting tab is typically employed.

The head lifting tab slides on the load ramp during loading and unloading, and rests on the load ramp to support the actuator while the heads are in an unloaded state (that is, the heads are positioned off of the disk). During loading, the head lifting tab slides along the load ramp until it reaches the end of the load ramp. Upon reaching the end of the load ramp, the lifting tab slides off of the load ramp and the heads of the actuator engage the storage medium. Similarly, during unloading, the lifting tab slidably engages the end of the load ramp and slides onto the load ramp and thereby lifts the heads away from the disk cartridge.

The lifting tab configuration preferably is lightweight to minimize the mass extending from the suspension, yet have sufficient strength such that deflection of the suspension is within a predetermined amount to prevent damage to the lifting tab, heads, or other components. The trend toward higher a real density, which diminishes the magnetic charge of the information and slider flying height, often has diminishes slider height. For example, disk drives using MR heads are growing in popularity, and are significantly thinner than thin film heads that have often been employed. Thinner heads, such as MR heads, cause a diminished gap (compared with thicker heads) between the suspension arm and the disk surface, which is problematic for the load ramp design and manufacturing.

In configurations in which the load ramp extends over top the disk surface, the diminished gap requires load ramps having even thinner ends. This is especially problematic for removable cartridge drives because the disk must be accurately positioned numerous times, and interchangeable cartridges might not have uniform dimensions because of manufacturing tolerances. Producing load ramps that have uniform, knife-like edges by conventional plastic manufacturing is difficult. Further, the plastic load ramp may wear after repeated loading and unloading cycles. Such wear may cause damage to the disk if the head is not sufficiently lifted. Further, the wear exacerbates the difficulties related to ramp edge thinness.

Dust infiltration into removable media cartridges is another important factor because of the trend toward higher a real density. Further, the cartridge may create particles because moving parts within the cartridge may abrade and form particles that can contaminate the media. Protection of recording media from dust is an important aspect of disk drive design.

It is a goal of the present invention to create a latch system that is easy to manufacture and avoids the drawbacks of the prior art.

SUMMARY OF THE INVENTION

An actuator for communicating with a disk cartridge may include an actuator arm for rotatably mounting the actuator to a disk drive. The actuator may be disposed in a disk drive that can receive a disk cartridge that has a storage medium. Disposed on the actuator may be a head gimbal assembly having read/write heads for interfacing with the storage medium. The actuator may also have a suspension arm mounted to the actuator arm and extending from the actuator arm. The suspension arm may have a longitudinal axis and a head lifting tab disposed in an angular relationship with the longitudinal axis of the suspension arm. One purpose of the head lifting tab is to lift the actuator away from a disk cartridge that has been inserted into the disk drive to which the actuator is installed.

When disposed in a disk drive, the actuator can move between a retracted position and a loaded position. In the retracted position, the head lifting tab rests on a load ramp disposed in the disk drive and supports the suspension arm and the read/write heads. In the loaded position, the head lifting tab is disengaged from the load ramp so that the read/write heads can interface with a storage medium of disk cartridge.

The head lifting tab may include a first portion, disposed proximal to the suspension arm, and a second portion extending from the first portion. The second portion may define an end of the head lifting tab. Both the first and the second portions may be curved. The first portion is preferably curved about a longitudinal axis of the head lifting tab, and the second portion may be curved about a line that is perpendicular to the longitudinal axis of the head lifting tab. In addition, the second portion may also be curved about the longitudinal axis of the head lifting tab. The first curved portion preferably increases the effective stiffness of the suspension. The second curved portion preferably stiffens the suspension and defines a camming (or rounded) surface for slidably engaging the load ramp of the disk drive. In a preferred embodiment, the first and the second curved portions are integrally formed with the suspension arm.

In the retracted position, the second curved portion of the head lifting tab rests on the load ramp of the disk drive and supports the actuator. When the actuator is moved to a loaded position to interface with a storage medium of a disk cartridge, the second curved portion slides along the load ramp until it reaches an end of the load ramp. At the end of the load ramp, the head lifting tab slides off of the load ramp and moves to the loaded position when the heads of the actuator interface with the storage medium of the disk cartridge. In order to move back to the retracted position, the actuator is moved so that the second curved portion of the head lifting tab slidably engages the load ramp. As the head lifting tab slidably engages the load ramp, the head lifting tab acts as a cam and lifts the read/write heads away from the storage medium of the disk cartridge. The head lifting tab can then slide along the load ramp to move the actuator and the read/write heads to the retracted position.

Preferably, the improved actuator of this invention can be rotatably mounted to a disk drive. A voice coil motor or similar device can be used to rotate the actuator, and thereby slide the head lifting tab along the load ramp.

The disk drive into which the improved actuator of this invention may be disposed may have a sensor and an eject system. The sensor preferably detects when a disk cartridge is inserted into the disk drive, and the eject system ejects the disk cartridge from the disk drive. Further, the disk drive into which the improved actuator of this invention may be disposed may be in electrical communication with a microprocessor and a computer programmable memory. In particular, the sensor, the eject system and the voice coil motor for powering the actuator may be in electrical communication with the microprocessor and the computer programmable memory. In operation, the sensor detects when a disk cartridge had been inserted into the disk drive and communicates this to the microprocessor. After noting the presence of a cartridge in the disk drive, the microprocessor communicates with the computer programmable memory, which controls the microprocessor, to power the voice coil motor. When powered, the voice coil motor rotates the actuator and the attached head lifting tab. The head lifting tab then slides along the load ramp to move the actuator and the read/write heads from the retracted position to the loaded position, as described above.

In order to eject the disk cartridge from the disk drive, the eject system may be activated. This activation may include depressing an eject button disposed on the disk drive. Upon activating the eject system, the eject system sends an electrical signal to the microprocessor informing the microprocessor and the computer programmable memory that it has been activated. The computer programmable memory then controls the microprocessor to power the voice coil motor. As the voice coil motor is powered, the actuator and the head lifting tab are moved from the loaded position to the retracted position, as described above.

According to another aspect of the present invention, a latch system for a removable cartridge disk drive is provided that comprises a removable cartridge and a load ramp. The removable cartridge has a top shell, a bottom shell, a disk disposed between the top shell and the bottom shell, and a latch for latching together the top shell and the bottom shell. The top shell and the bottom shell are pivotable between an open and a closed position about a pivot axis that is substantially perpendicular to an axis of rotation of the disk. In the closed position, the cartridge substantially encloses the disk, and in the open position, the cartridge enables access to the disk. The latch includes a strike member pivotally coupled to the cartridge. The strike member has a catch that latches together the top shell and the bottom shell. The latch also includes a biasing spring that urges the strike member to a closed position. The load ramp is coupled to the disk drive for loading and unloading an actuator arm of the disk drive, and strikes the strike member to unlatch the cartridge in response to the cartridge being inserted into the disk drive.

The latch system may also comprise a labyrinth seal that includes a top barrier wall projecting from the top shell and a bottom barrier wall projecting from the bottom shell. The top barrier wall forms a top aperture, and the bottom barrier wall forms a bottom barrier. The load ramp extends into each one of the top aperture and the bottom aperture while the cartridge is in an operational position within the disk drive, whereby the labyrinth seal inhibits particle contamination of the disk and enables the load ramp to access the disk.

The latch system includes the latch described above, which is disposed in a first portion of the cartridge near a side of the front portion, and a second latch, which is disposed in a second portion of the cartridge near an opposing side of the front portion. The second latch includes a strike plate, the strike plate of the first latch movable within a first front portion of the cartridge that is defined by the disk and a first front side of the cartridge, and the strike plate of the second latch movable within a second front portion of the cartridge that is defined by the disk and a second front side of the cartridge, whereby space is conserved.

The movable portions of the first latch and the second latch are disposed on the outboard side of the labyrinth seal to inhibit particle contamination of the disk. The strike plate is oriented substantially vertically and includes a collar that is pivotally mounted to a pivot post fixed within the cartridge. The catches are protrusions from the strike plates, and the cartridge includes a first aperture and a second aperture into which the protrusions are insertable to latch together the top shell and the bottom shell. The present invention encompasses a disk drive that includes these features.

BRIEF DESCRIPTION OF THE DRAWINGS

FIG. 3 is a side view of a portion of the embodiment depicted in FIG. 1 in a loaded position;

FIG. 4 is another side view of the portion of the embodiment depicted in FIG. 3 during the unloading process;

FIG. 5 is another side view of the portion of the embodiment depicted in FIG. 3 in an unloaded position;

DETAILED DESCRIPTION OF PREFERRED EMBODIMENTS

Figure 1:
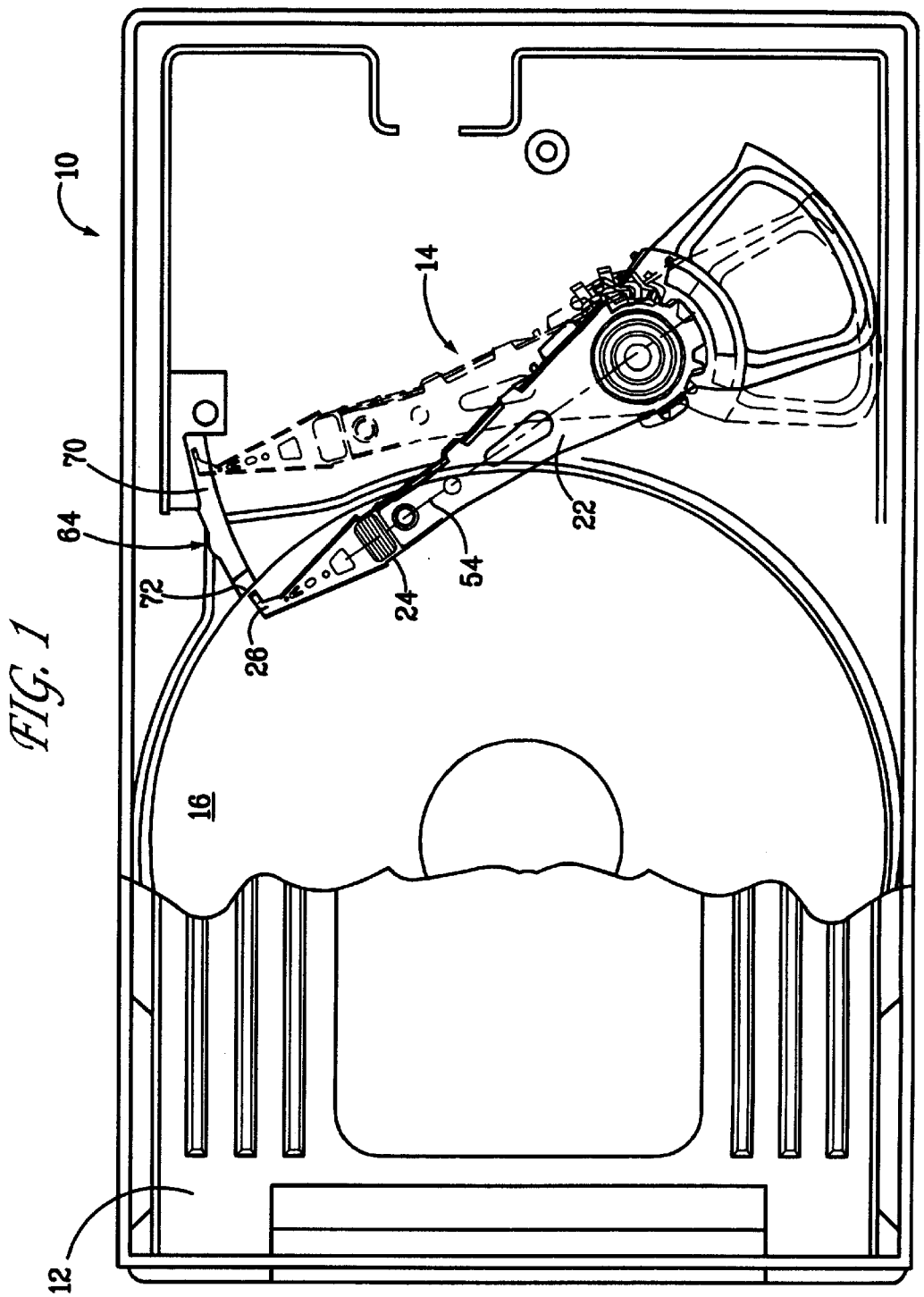
FIG. 1 is a top view of an embodiment of this invention.

A disk drive 10 that interfaces with a disk cartridge 12 typically has an actuator 14 for interfacing with a disk cartridge 12. A disk cartridge 12 has a storage medium 16 for storing information. One such storage medium 16 of a disk cartridge 12 is depicted in FIG. 1. The actuator 14 of this invention may be employed in a variety of disk drives 10, one of which is shown in FIG. 1. The disk drive 10 may have a platform (not shown) upon which the actuator 14 is disposed. The platform may be metallic, plastic, a combination of plastic and metal or any suitable material. Disk drive 10 and cartridge 12 may be substantially as described in co-pending U.S. patent application Ser. No. 08/835,437, filed Apr. 9, 1997 now U.S. Pat. No. 6,137,771, entitled, "Shutterless Data Recording Cartridge and Drive for Using Same," which is assigned to the present assignee and incorporated herein in its entirety.

Figure 7:
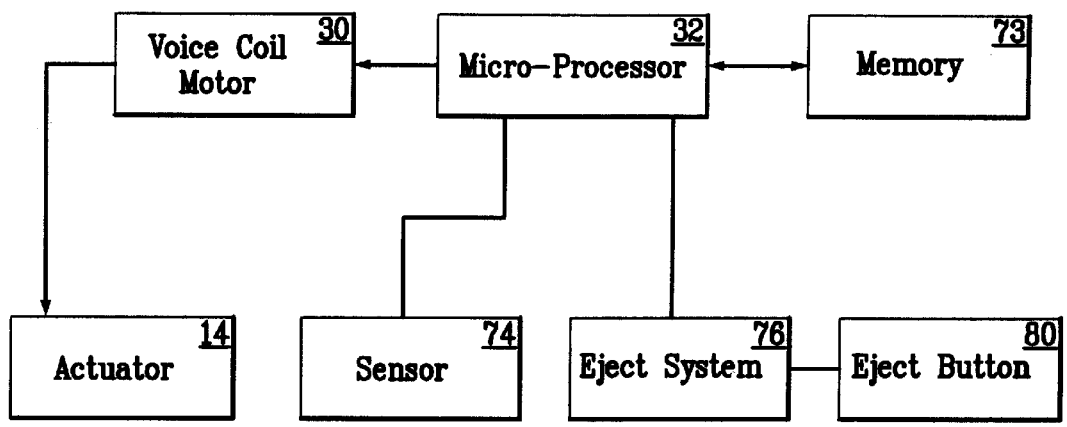
FIG. 7 is a block diagram illustrating the controls of a disk drive that may employ the present invention.
Figure 8:
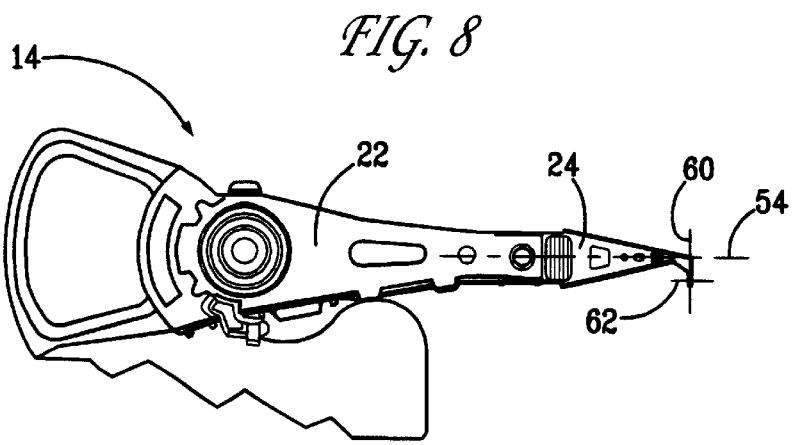
FIG. 8 is a plan view of a portion of the embodiment of FIG. 1.
Figure 8A:
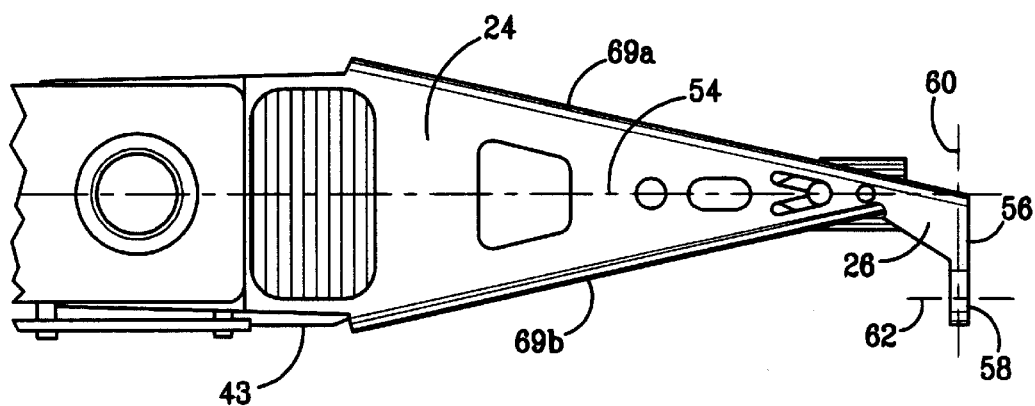
FIG. 8A is an enlarged view of a portion of the embodiment of FIG. 8.

The actuator 14 of this invention may be a rotary type actuator that is rotatably mounted to the disk drive 10, as shown in FIG. 1. In addition, the actuator 14 of this invention may have a pair of actuator arms 22, a pair of suspension arms 24, a pair of head lifting tabs 26 and a head gimbal assembly 28. Aspects of this actuator 14 are also shown in FIGS. 8 and 8A. A voice coil motor 30, as shown schematically in FIG. 7, may be mounted to the disk drive 10 to control the movement of the actuator 14. Preferably, the voice coil motor 30 interfaces with a microprocessor 32 to control the movement of the actuator 14. As described in more detail below, the microprocessor 32 and the voice coil motor 30 move the actuator 14 in between at least two different positions, a loaded position and a retracted position. In the loaded position, the actuator 14 can interface with the storage medium 16 of the disk drive 10. Conversely, in the retracted position, the actuator 14 does not interface with the storage medium 16 of the disk drive 10 and is retracted so that the likelihood of damage to the head gimbal assembly 28 of the actuator 14 is minimized.

Figure 2:
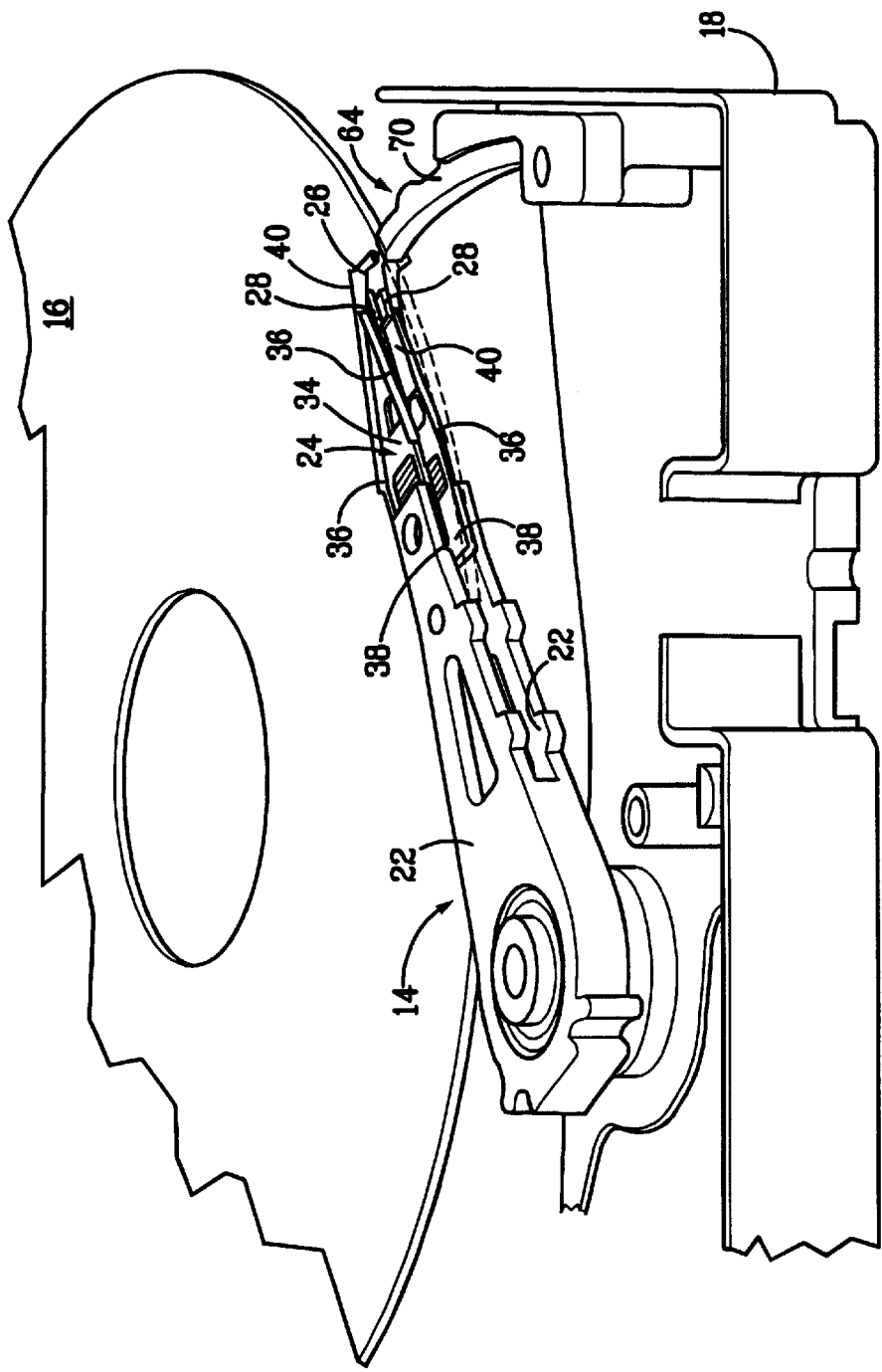
FIG. 2 is an perspective view of a portion of the embodiment of the invention depicted in FIG. 1.
Figure 6:
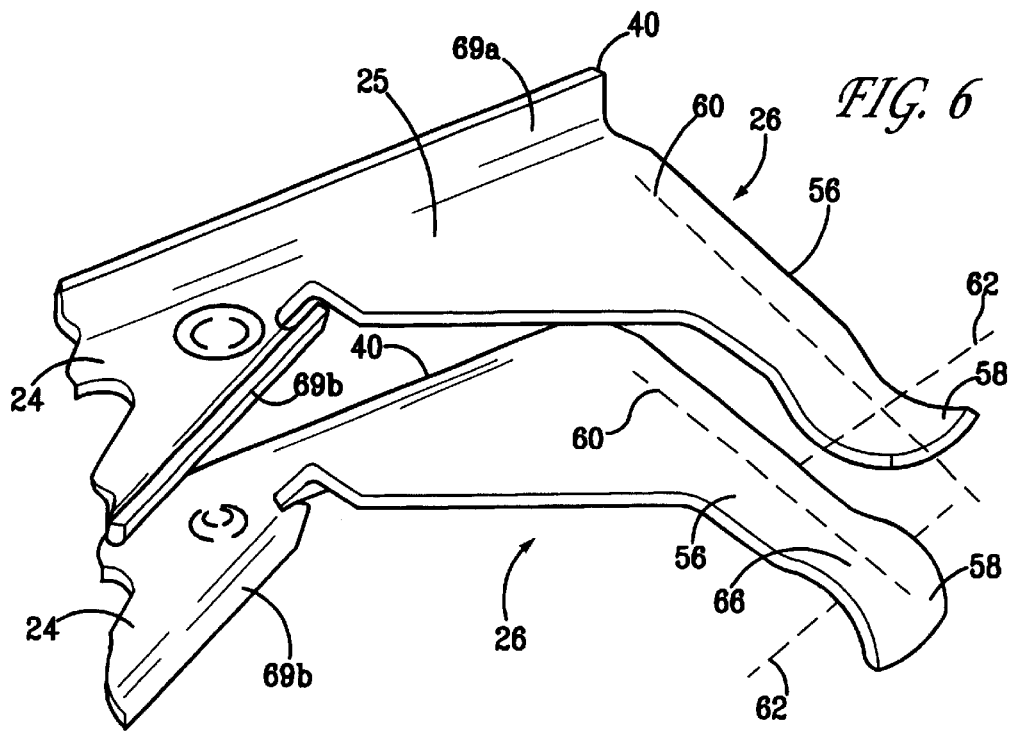
FIG. 6 is an perspective view of a portion of the embodiment shown in FIG. 1.

The actuator arms 22 are preferably rotatably mounted to the disk drive 10 and preferably are manufactured from aluminum. The actuator arms 22 may be integrally formed with each other, as shown in FIG. 2. One of the functions of the actuator arms 22 is to provide structural support for the suspension arms 24. One of the suspension arms 24 extends from each actuator arm 22. The suspension arms 24 preferably comprises a manufacturable metal and even more preferably stainless steel. In a preferred embodiment, the suspension arms 24 are relatively thin. Preferably, the suspension arm 24, that is attached to the top actuator arm, has a portion 34 that has sides 36 extending from a top surface of the suspension arm 24. Similarly, the suspension arm that is attached to the bottom actuator arm 22 has a portion that has sides 36 extending from a bottom surface (not shown). These sides 36 define a groove for attaching a wire 43, as shown in FIG. 8a, that electrically connects the heads 42 to the microprocessor. The suspension arms 24 may be ball swayed to the respective actuator arms 22 or attached by other known fastening techniques. One of the functions of the suspension arms 24 is to connect the actuator arm 22 to the head gimbal assemblies 28, which are preferably disposed on each of the suspension arms 24. The head gimbal assemblies 28 may be attached to the suspension arms 24 so that they can float on the suspension arms 24. In a preferred embodiment of this invention, the actuator arms 22 are attached to a first end 38 of the suspension arms, and the head gimbal assemblies 28 are each attached to a second end 40 of the suspension arms. The second end 40 of the suspension arms 24 preferably oppose the first end 38 of the suspension arms 24, and the first 38 and the second ends 40 are most preferably disposed at either longitudinal end of the suspension arms 24. As best shown in FIG. 6, an extension 25 preferably extends from the outboard side of suspension arm 24 at end 40.

Each of the head gimbal assemblies 28 preferably includes a pair of sliders or read/write heads 42 that have magnetic read/write elements, as is best shown in FIG. 4, for interfacing with the storage medium 16 of the disk cartridge 12, as is best shown in FIGS. 3–5. A wire 43, as shown in FIG. 8a, for electrically connecting the magnetic read/write heads of the head gimbal assembly to the microprocessor 32 may be attached to the suspension arms 24 and the actuator arms 22.

Disposed on each of the suspension arms 24, as is best shown in FIGS. 2, 8 and 8A, is the head lifting tab 26 of this invention. In a preferred embodiment, the head lifting tab 26 is formed integrally with each of the suspension arms 24. The head lifting tabs 26 may extend from an end of each of the suspension arms 24. Preferably, the head lifting tabs 26 extend from the second end 40 of the respective suspension arm 24. The head lifting tabs 26 may extend in an angular relationship with the respective suspension arm 24. In a preferred embodiment the head lifting tabs 26 extend from the respective suspension arm 24 in an angular relationship with the longitudinal axis 54 of the suspension arm 24, which is also the longitudinal axis of the actuator 14. In the embodiment shown, the head lifting tabs 26 extends perpendicular with the longitudinal axis 54 of the suspension arm 24. However, the head lifting tabs 26 may be disposed at other angles with the longitudinal axis 54 of the suspension arm 24.

Figure 9:
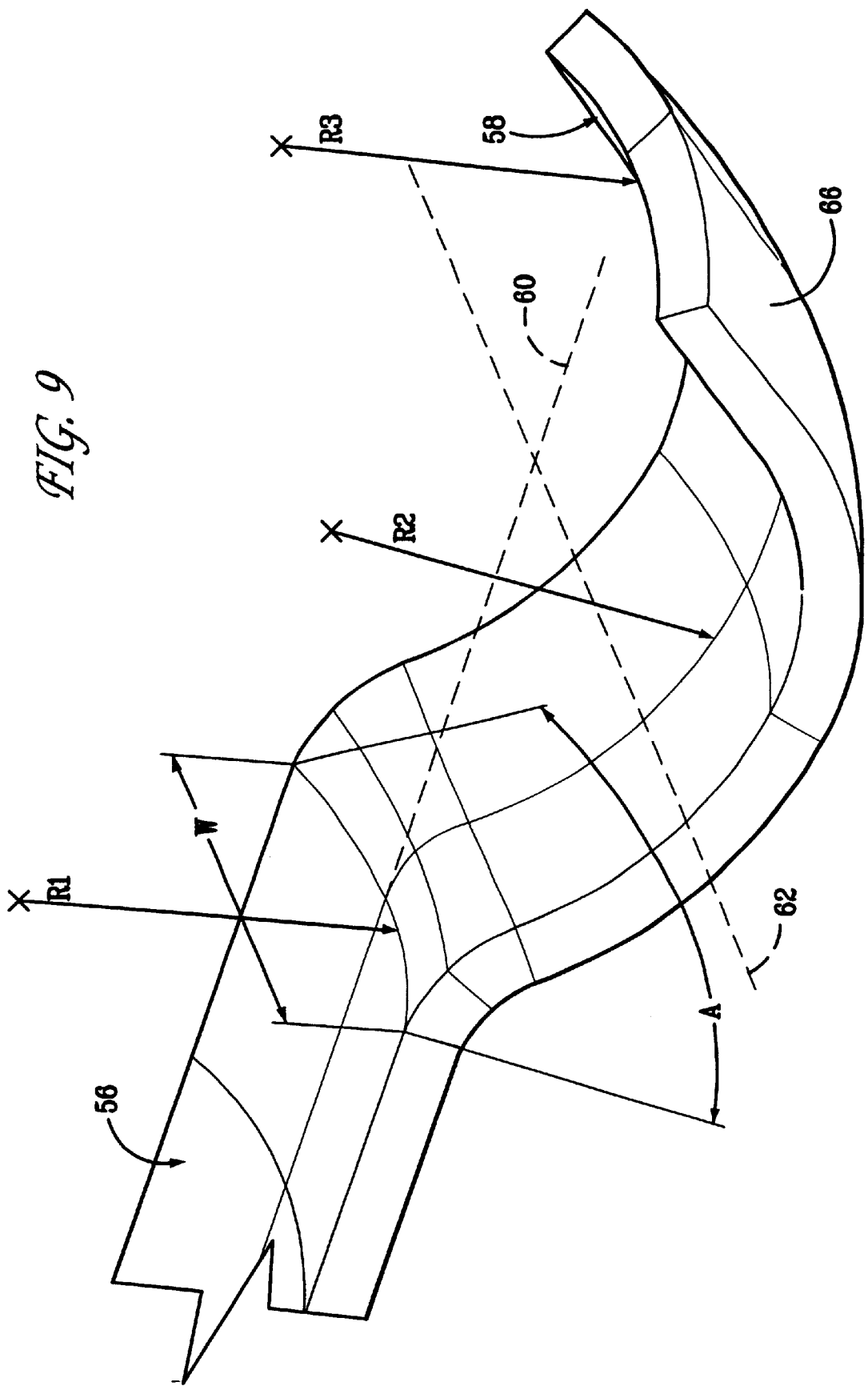
FIG. 9 is an enlarged view of a portion of the embodiment of FIG. 6.

As shown in FIGS. 6 and 9, each of the head lifting tabs 26 may have a first portion 56 and a second portion 58. The first portions 56 extend from the second end 40 of the respective suspension arm 24, and the second portions 58 extend. from the respective first portions 56. Each of the first portions 56 may generally have a curved shape. The first portions 56 may have a curved shape that is concave (as shown in FIG. 9). The present invention also encompasses first portions 56 that are substantially flat (not shown in FIG. 9). The first portions 56 may be curved about a first axis 60 of the head lifting tab 26. In an embodiment, first portion 56 may be curved at a radius R1 of about 0.7 mm.

According to an aspect of the present invention, the second portion 58 of each of the head lifting tabs 26 may also be curved, and is preferably concave. The second portions 58 of the head lifting tabs 26 are curved to form a cammed surface 66 for interfacing with a load ramp 64 disposed in the disk drive 10. As shown and described in further detail below, the cammed surfaces 66 can slidably engage the load ramp 64.

Preferably, the second portion 58 of each of the head lifting tabs 26 is curved both about first axis 60 and about a transverse axis 62 that is perpendicular to the first axis 60 of the head lifting tabs 26. In a preferred embodiment shown in FIG. 9, which shows second portion 58 curved about axis 60 and axis 62, the curve of the second portions 58 may be curved at a radius R2 (that is, about an axis parallel to transverse axis 62) of about 0.54 mm. A curvature R3 (that is, about an axis parallel to first axis 60) of second portions 58 preferably is approximately 0.7 mm, which is consistent with the corresponding curvature R1. First portion 56 may have a cord width W of approximately 0.54 mm. Because R1 preferably is approximately equal to R3, cord width W is approximately uniform between first portion 56 and second portion 58. Cord angle A is approximately 44 degrees.

To form second portion 58, outside edges of second portion 58 may be etched to reduce thickness relative to the other parts thereof. During the forming process (that is, forming or stamping about axis 62), second portion 58 also curves about axis 60. Further, a coining process may be employed to obtain a smooth finish, especially for cammed surface 66.

The first 56 and second portion 58 of each of the head lifting tabs 26 increase the effective stiffness of the respective lifting tab 26 because they are curved and thereby add mass and increase the moment of inertia of the head lifting tab 26. This is important for several reasons. As the stiffness of the head lifting tab increases, the deflection of the head lifting tab 26 when the lifting tab 26 is being moving off of the load ramp 64 and onto the storage medium is decreased. Thus, the deflection of the head lifting tab 26 is diminished when moving off of the storage medium and onto the load ramp 64. Decreasing the deflection of the head lifting tab 26 is significant because it limits the amount of bending of the tab 26 during loading and unloading. This reduces the likelihood of the heads contacting a surface of the disk drive during loading and unloading and being damaged.

Furthermore, a stiffer head loading tab 26 ensures that the heads will lift off of the storage medium quickly against the vacuum that is created by the negative pressure area of the slider and the rotating storage medium. The vacuum tends to pull the heads towards the storage medium and must be overcome by the head lifting tab to unload the heads. The stiffer head lifting tab is more responsive to unload the heads and prevent the heads from being dragged on the medium and being damaged or damaging the storage medium.

Because the head lifting tab 26 is curved, only the camming surface 66 contacts the load ramp 64. This is in contrast to previous designs in which an edge of a head lifting tab contacts the load ramp. Because the camming surface 66 is smoother than an edge, the camming surface 66 reduces the likelihood of wear on the load ramp, as the camming surface 66 rides on the load ramp 64 during the loading and unloading operations. Reducing the wear on the ramp 64 has the potential to increase the life of the load ramp 64, and may prevent media damage.

Having a head lifting tab 26 that is curved about the axis 62 to define a camming surface 66 also reduces the tolerance sensitivity that is needed to ensure that the head lifting tab 26 engages the load ramp during the head unloading sequence relative to head lifting tabs that have edges for engaging the load ramp. This occurs because the camming surface 66 is more likely to ride up the loading ramp 64 if the surface is not as precisely manufactured, as an edge surface. The reduction in tolerance sensitivity has the potential to translate into a reduction in manufacturing costs.

The head lifting tabs 26 of this invention may interact with a variety of load ramps. One type of load ramp 64 that the head lifting tab 26 may interact with is shown in FIGS. 1 and 2. As shown, the load ramp 64 may have a guiding surface 68 on its top and its bottom. Each of the guiding surfaces 68 may have a first region 70 and a second region 72. The first regions 70 may be relatively flat and disposed parallel to the disk drive platform (that is, substantially horizontal). In comparison, the second regions 72 may be disposed in an angular relationship with the respective first regions 70. The first regions 70 are for supporting the respective head lifting tabs 26 and the actuator 14 when the actuator 14 is not interfacing with a disk cartridge 12. This position may be referred to as the retracted position. In this retracted position, the read/write heads 42 are supported by the head lifting tabs 26 and the load ramp 64 and are disposed toward the rear of the disk drive 10. Thus, in the retracted position the read/write heads 42 are in a position which reduces the likelihood of damage to the read/write heads 42.

The second region 72 provides a ramp 64 for the head lifting tabs 26 to slide upon as they either move from their retracted position to the loaded position in which the attached read/write heads 42 interface with a storage medium 16 of a disk cartridge 12 or from the loaded position to the retracted position. This is best understood with reference to FIGS. 1 and 3–5. FIG. 1 in phantom and FIG. 5 depict the camming surfaces 66 of the head lifting tabs 26 resting on the load ramp 64 in the retracted position. In order to move from the retracted position, the actuator 14 rotates in a counter clockwise direction as shown in FIG. 1. As the actuator 14 rotates, the camming surfaces 66 of the head lifting tabs 26 slides along the first regions 70 until the head lifting tabs 26 reach the second regions 72 of the load ramp 64. Upon reaching the second regions 72 of the load ramp 64, the camming surfaces 66 of the head lifting tabs 26 slide down and up respectively on the load ramp 66 as is best shown in FIG. 4. After sliding down and up the second regions 72 of the load ramp 64, the head lifting tabs 26 slides off of the load ramp 64 and the read/write heads 42 of the actuator 14 are in the loaded position, as shown in FIGS. 1 and 3 and can interface with the storage medium 16 of the disk cartridge 12.

In order to move the actuator 14 and the read/write heads 42 from the loaded position to the retracted position, the actuator 14 rotates in the clockwise direction as shown in FIG. 1. As the actuator 14 rotates, the camming surfaces 66 comes into proximity with the second regions 72 of the load ramp 64 and engage the load ramp 64, as shown in FIG. 4. As the camming surfaces 66 slidably engage the load ramp 64, the actuator 14 is displaced in a direction that is approximately perpendicular to the chassis 18 of the disk drive 10 and the head lifting tabs 26 thereby lifts the read/write heads 42 off of the storage medium 16 of the disk cartridge 12. In order to move to the retracted position, the actuator 14 continues to rotate in the clockwise direction, as shown in FIG. 1, and the camming surfaces 66 slides up and down the second regions 72 of the load ramp 64. The camming surfaces 66 reach the first regions 70 of the load ramp 64 and then slide along the first regions 70 until the retracted position is reached, as shown in FIG. 5. In the retracted position, the actuator 14 stops rotating, and the actuator 14 rests with the read/write heads 42 supported by the head lifting tabs 26 and the load ramp 64.

The head lifting tabs 26 are preferably spring biased by the suspension arms 24 toward each other, as is best shown by comparing FIGS. 3 and 4. In the loaded position in which the head lifting tabs 26 are not resting on the load ramp 64, the read/write heads have moved proximal to each other with the storage medium disposed between them. By way of contrast, in FIG. 4 the head lifting tabs 26 have engaged the load ramp 64. In this engaged position, the head lifting tabs 26 have moved away from each other and thereby moved the read/write heads 42 away from each other. In the retracted position as shown in FIG. 5, the head lifting tabs 26 have been moved even further from each other as have the read/write heads 42.

In order to move the head lifting tabs 26 between the retracted position and the loaded position, the actuator 14 may have, as referred to above, a voice coil motor 30. This voice coil 30 motor may be in electrical communication with a microprocessor 32 and a computer programmable memory 73 that has programmed code for controlling the operation of the microprocessor 32, as depicted schematically in FIG.

7. The disk drive 10 may also have a sensor 74 that may be either mechanical or electrical in nature for sensing when a disk cartridge 12 is inserted into the disk drive 10 and an eject system 76 for ejecting a disk cartridge 12 from the disk drive 10. The sensor 74 and the eject system 76 may be in electrical communication with the microprocessor 32. Neither the sensor 74 nor the eject system 76 is a novel feature of this invention, but they may be employed with the actuator 14 of this invention.

When a disk cartridge 12 is inserted into the disk drive 10, the sensor 74 will detect its presence and electrically communicate this to the microprocessor 32. The memory 73 will then control the microprocessor 32 to power the voice coil motor 30 of the actuator 14. When powered, the voice coil motor 30 will rotate the actuator 14 and the actuator 14 will move from the retracted position to the loaded position, as described above.

In order to eject a disk cartridge 12 from the disk drive 10, the eject system 76 is activated and a signal is sent to the microprocessor 32. Activation of the eject system 76 may include depressing an eject button 78 disposed on the disk drive 10. The microprocessor 32 then communicates with the memory 73, which controls the microprocessor 32 to power the voice coil motor 30 and move the actuator 14 from the loaded position to the retracted position.

In summary, the actuator 14 of this invention may have an improved head lifting tab 26. The improved head lifting tab 26 preferably extends from an end of the actuator 14 and in an angular relationship with the first axis of the actuator 14. The head lifting tab 26 may have a first 56 and a second 58 portion both of which are curved. The second portion 58 is preferably curved to form a camming surface 66 for slidably engaging a load ramp 64 of a disk drive 14. The camming surface 66 slides along the load ramp 64 to move the actuator between a retracted position and a loaded position. In order to move from the loaded position, the camming surface 66 slidably engages the load ramp 64 to lift the read/write heads 42 of the actuator 14 off of the disk cartridge 12 and onto the load ramp 64. The camming surface 66 then slides along the load ramp 64 as the actuator 14 moves to its retracted position. The present invention encompasses a lifting tab that is substantially flat—that is, a first portion (not shown) that is not curved around axis 60 According to another aspect of the present invention, stiffener 69a and 69b are formed along the length of the suspension arm 24. The stiffener 69a extends beyond the major portion of arm 24 so as to stiffen an extension 25 of arm 24, as best shown in FIG. 6. Preferably, stiffener 69a is integrally formed with suspensions 24 and extension by stamping and coining metal to form substantially mutually perpendicular members. Stiffeners 69a and 69b stiffen suspension arm 24, and stiffener 69a is especially beneficial because it resists and diminishes angular deflection of the lifting tab by stiffening extension 25.

The head lifting tab 26 of this invention has several advantages including an increased stiffness, which minimizes the deflection of the head lifting tab 26 and the likelihood of damaging the heads during head loading and unloading. Further, because the head lifting tab 26 has a camming surface 66, the likelihood of wear on the ramp is decreased and the tolerance sensitivity of the tab 26 is decreased.

Some prior art lifting tabs extend along a centerline of the suspension arm. However, with disks longer than a 2.5 inch form factor, a lifting tab that forms an angular relationship with the arm centerline saves space, as shown in FIG. 6 according to the present invention. Specifically, tabs that extend along the suspension centerline must be long enough to extend to the end of load ramp (whether over top of the disk or outside the disk perimeter) before the head reaches the disk into perimeter (during unloading). As the disk form factor gets larger, especially greater than 2.5 inches, the overall length of the suspension arm (including the extension) becomes difficult to fit into a standard width drive bay. The present invention is preferably employed with a disk having a 3.5 inch form factor, so the configurations of lifting tabs 26 conserve space.

Referring to FIGS. 10 through 13 to illustrate another aspect of the present invention, cartridge 12 includes latches 80a and 80b that are disposed proximate cartridge front portions 120a and 120b, respectively. Cartridge 12 includes a top shell 112 and a bottom shell 114 that are pivotally joined at a hinge 122. Top shell 112 includes a continuous, substantially planar top surface 113a (FIG. 14), from which sidewalls 113b extend. Bottom shell 114 includes a substantially planar top surface 115a, from which sidewalls 115b extend. Bottom surface 115a also includes an opening through which the disk hub may be accessed by a spindle motor, which is shown in relief as reference numeral 17 in FIG. 10. The top shell and the bottom shell are pivotable apart to form a drive head opening 124, as shown in simplified form in FIG. 14 (from which numerous features, including the latches, are removed for clarity), at a front thereof to enable access by the heads 42. Top shell 112 and bottom shell 114 pivot about an axis that is substantially perpendicular to an axis of rotation of disk 16 to form opening 124.

Cartridge 12 includes labyrinth seals around disk 16 within the cartridge, which are generally designated by reference numeral 125, and may also include a seal at the rear portion of cartridge 12, as describe in co-pending U.S. patent application Ser. No. 09/346,485 (Attorney Docket Number IOM-3869), entitled, "A Shutterless Data Recording Cartridge and Seal," which is assigned to the assignee of the present invention and incorporated herein in its entirety. The present invention encompasses the labyrinth seal fully surrounding the disk.

According to aspect of the present invention. cartridge 12 includes a labyrinth seal that includes seal portions 94a, 94b, 95a, and 95b disposed at front portion 120a and seal portions 96 and 97 disposed at front portion 120b. As shown, in FIG. 14, the labyrinth seal is pivoted with the bottom shell and top shell to form opening 124 along the front of the cartridge such that load ramp 64 and rotary actuator 14 may access disk 16.

Figure 12:
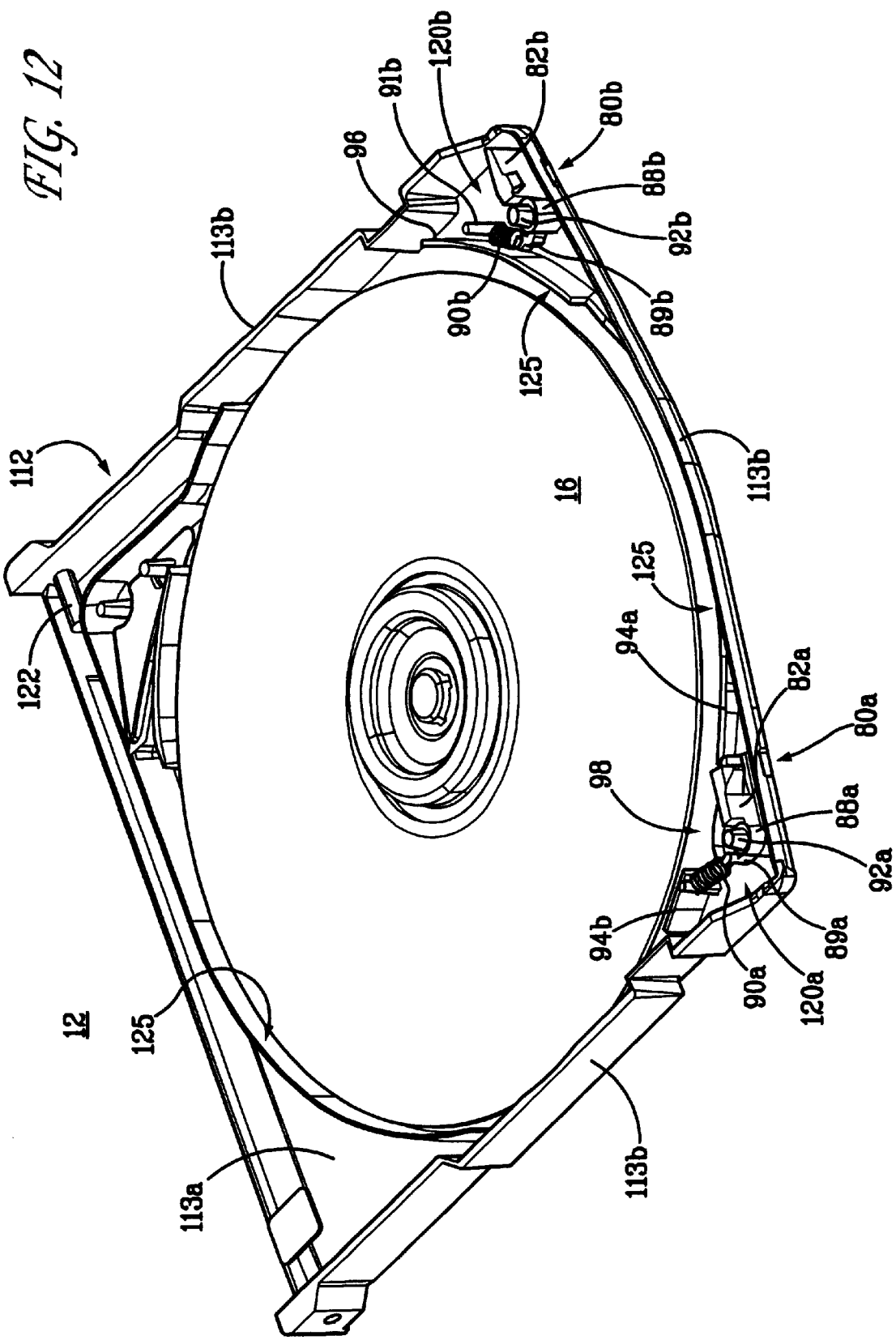
FIG. 12 is a bottom perspective view of the of the disk cartridge of FIG. 11 with the bottom shell removed for clarity.

Referring to FIG. 12, seal portions 94a and 94b are formed by barrier walls that project substantially perpendicular from an interior surface of top surface 113a. Ends of the barrier walls 94a and 94b define an aperture 98 therebetween. Barrier walls 94a and 94b substantially span from the sidewall to the front wall of cartridge 12 (with aperture 98 substantially interrupting or at least partially interrupting the span) at cartridge front portion 120a. Seal portion 96 is formed by a barrier wall that projects substantially perpendicular from an interior surface of top surface 113a. Seal portion 96 lacks an aperture so as to form a continuous barrier to dust infiltration. Barrier wall 96 substantially spans from the sidewall to the front wall of cartridge 12. The portions of cartridge 12 where the sidewalls meet the front walls are referred to herein generally as "corners" even though the sidewall and front wall meet at an oblique angle in the preferred embodiment.

Figure 10:
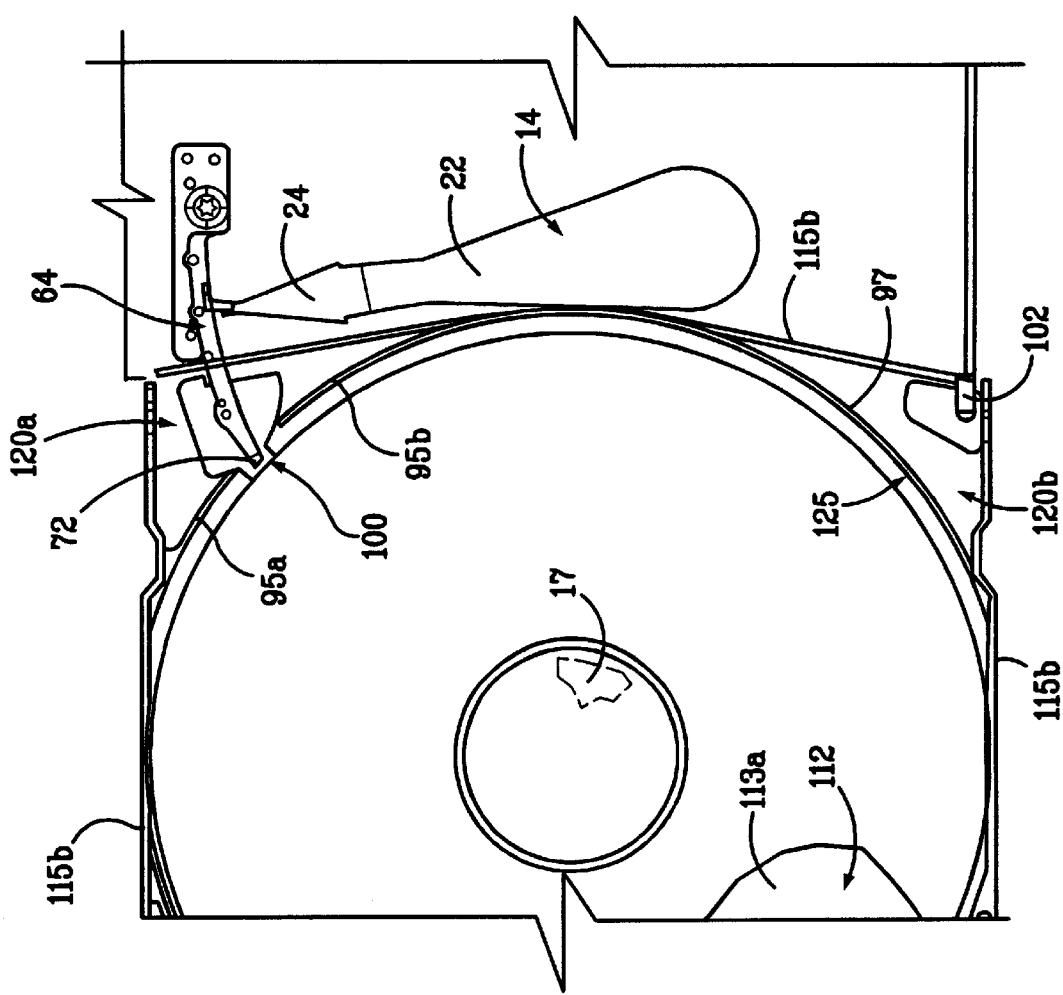
FIG. 10 is a top view of a disk drive and cartridge according to another aspect of the present invention, with portions thereof (particularly the latches) removed for clarity.

Referring to FIG. 10, seal portions 95a and 95b are formed by barrier walls that project substantially perpendicular from an interior surface of bottom surface 115a. Ends of the barrier walls 95a and 95b define an aperture 100 therebetween. Barrier walls 95a and 95b substantially span from the sidewall to the front wall of cartridge 12 (with aperture 100 substantially interrupting or at least partially interrupting the span) at cartridge front portion 120b. Seal portion 97 is formed by a barrier wall that projects substantially perpendicular from an interior surface of bottom surface 115a. Seal portion 97 lacks an aperture so as to form a continuous barrier to dust infiltration. Barrier wall 97 substantially spans from the sidewall to the front wall of cartridge 12.

Seal portion 94a is aligned in close relation with seal portion 95a such that they overlap to form a labyrinth while cartridge 12 is in a closed position. Similarly, seal portion 94b is aligned with seal portion 95b, and seal portion 96 is aligned with seal portion 97 in close relation to form respective labyrinths. Preferably, the top seals 94a, 94b, and 96 are outboard (that is, farther from the center of disk 16) from bottom seals 95a, 95b, and 97. Further, apertures 98 and 100 are aligned to form a continuous aperture through which the load ramp 64 may protrude.

Front portion 120a is defined by barrier walls 94a, 94b, 95a, and 95b; the side portions of sidewalls 113b and 115b; and the front portions of sidewalls 113b and 115b (which encompasses a first corner of cartridge 12). Front portion 120b is defined by barrier walls 96 and 97; the side portions of sidewalls 113b and 115b; and the front portions of sidewalls 113b and 115b (which encompasses a second corner of cartridge 12). Thus, front portions 120a and 120b are substantially triangular but for one side which is curved. It is an important aspect of the present invention that the movable portions of latches 80a and 80b are disposed within portions 120a and 120b, which are on the outboard sides of the seals. Specifically, particles that are produced by interaction of the moving parts of latches 80a and 80b are separated from the disk 16 by the seals, thereby protecting the disk 16 from contamination.

Figure 11:
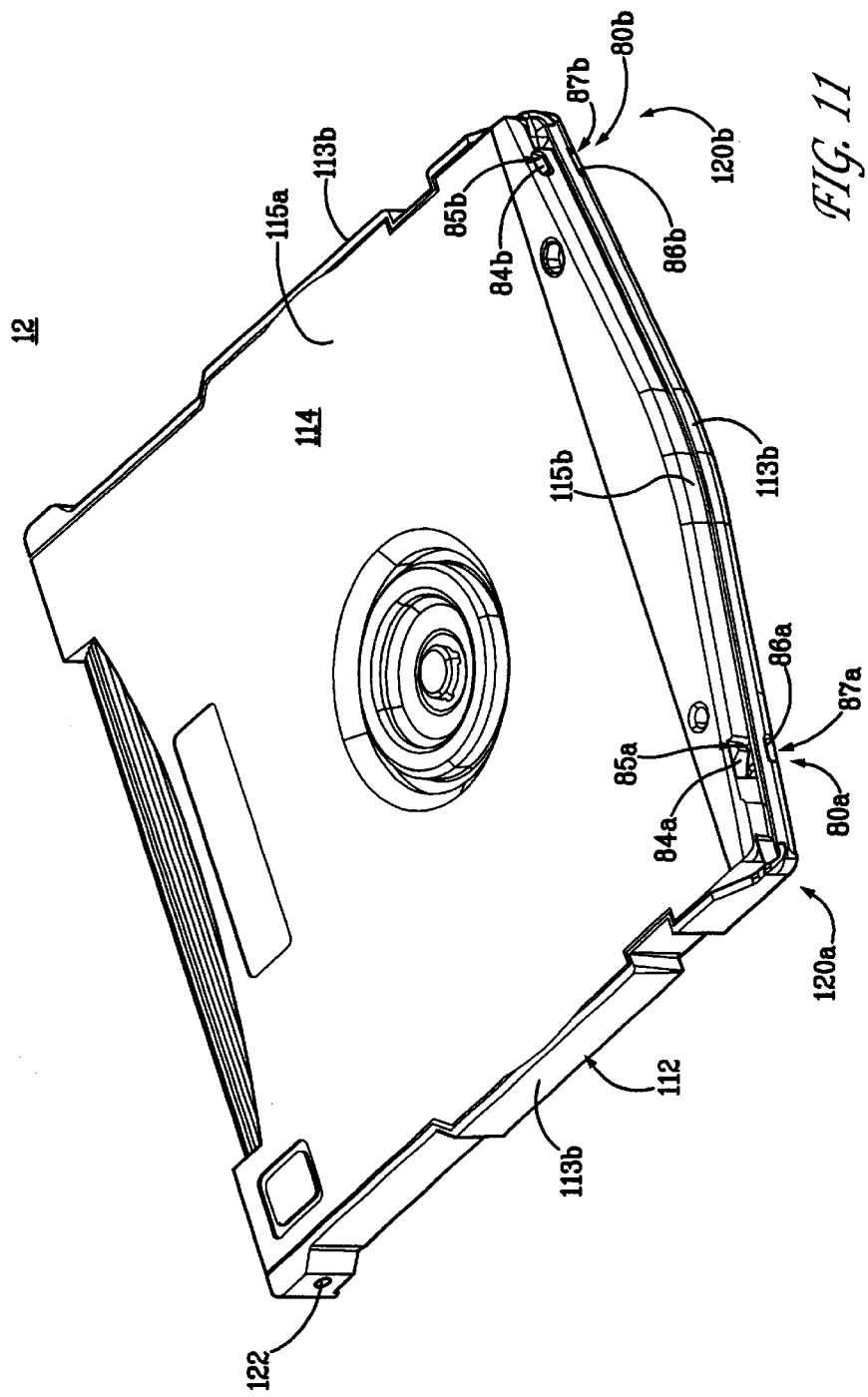
FIG. 11 is a bottom perspective view showing the disk cartridge of FIG. 10 in a closed position (and showing a portion of the latches omitted from FIG. 10)
Figure 13:
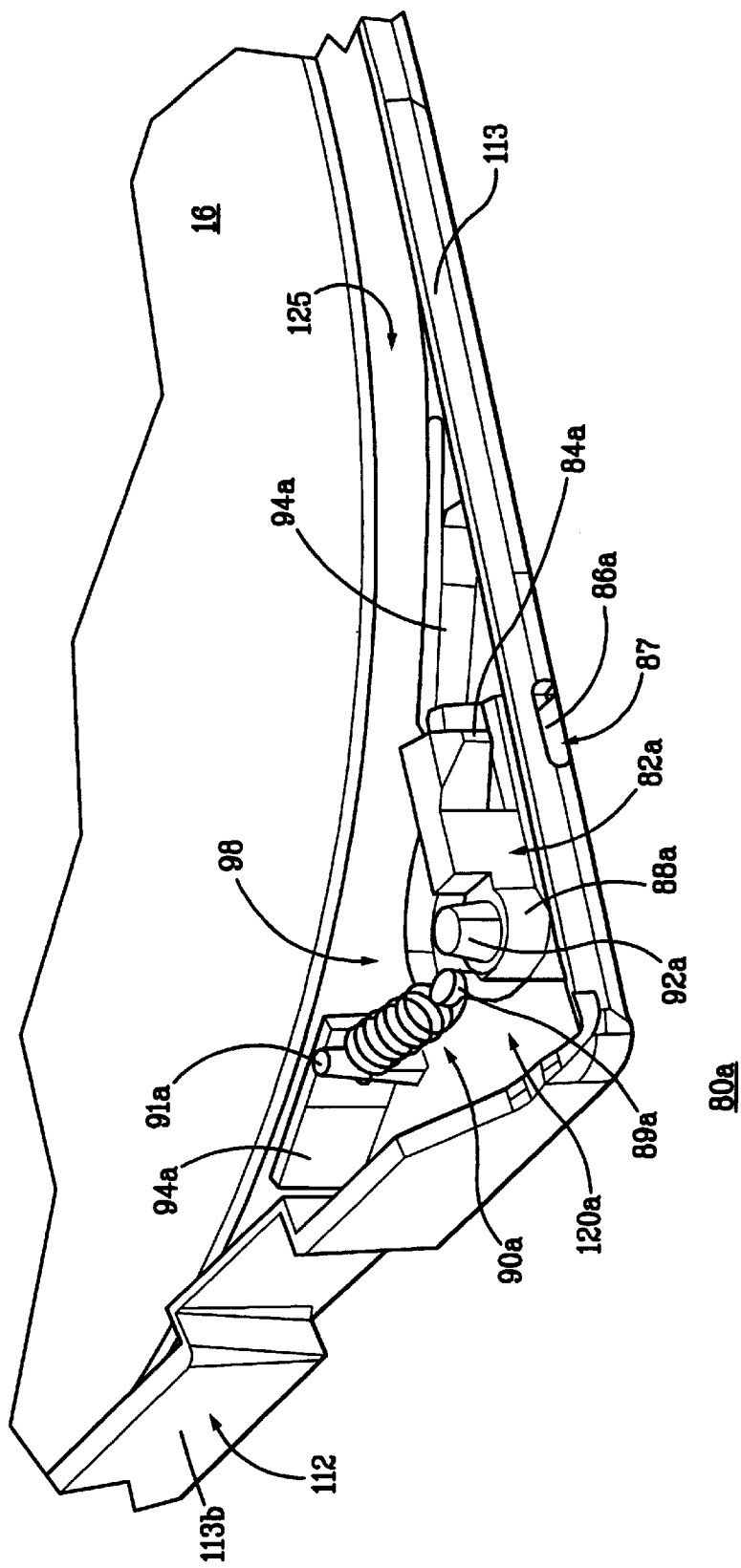
FIG. 13 is an enlarged view of a portion of the cartridge shown in FIG. 12.
Figure 14:
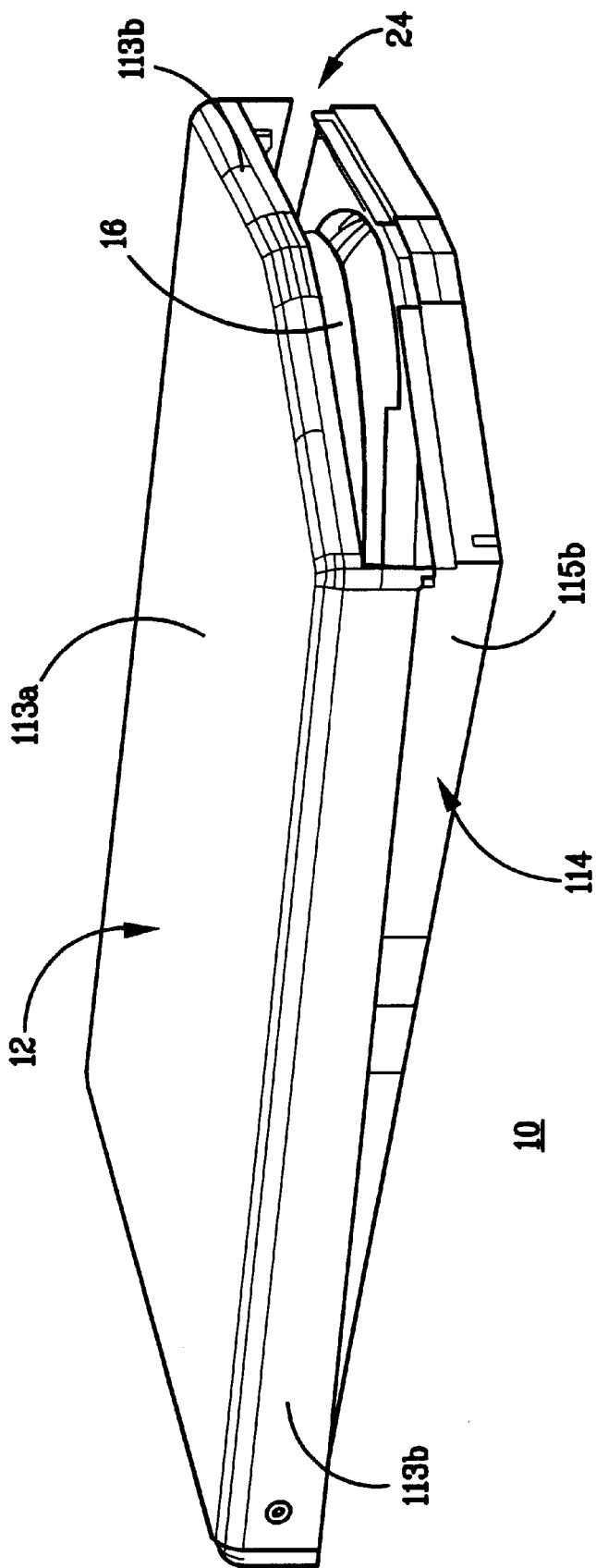
FIG. 14 is a simplified view of a cartridge similar to that shown in FIG. 11 to illustrate an open position of the cartridge.

Referring to FIGS. 11–13, each latch 80a and 80b respectively includes a strike member, such as strike plate 82a and 82b, that is pivotally coupled to cartridge 12. Strike plate 82a includes a lower catch 84a and an upper catch 86a. Strike plate 82b includes a lower catch 84b and an upper catch 86b. The terms "upper" and "lower" as used herein refers to an upright orientation of the cartridge, as shown in FIG. 14 and opposite that shown in FIGS. 11–13. Each catch protrudes into a respective aperture or hollow formed in a front portion of the cartridge. Each catch 84a, 84b, 86a, and 86b preferably includes a triangular or pyramid-shaped protrusion that is insertable into respective apertures 85a, 85b, 87a, and 87b formed in the shell front portion. Specifically, the catches are sloped (relative to a horizontal plane) to enable the catches easily slide into the respective apertures even if the catches are slightly misaligned with the apertures. Aperture 85a is larger than apertures 85b, each of which are larger than apertures 87a and 87b to accommodate the unlatching members, as described below.

Referring to FIGS. 12 and 13, each strike plate 82a and 82b has a collar 88a and 88b, respectively, that is preferably integrally molded therewith from an engineering plastic. Each collar 88a and 88b is pivotable on a pivot post 92a and 92b, respectively, that protrudes from the cartridge. Preferably, pivot posts 92a and 92b protrude substantially perpendicular from the interior surface of top surface 113a, as shown in the Figures. Each latch 80a and 80b includes a spring 90a and 90b, respectively. Each spring has an end coupled to a spring arm 89a and 89b, respectively, which is rigidly coupled to collar 88a and 88b. The other ends of springs 90a and 90b are coupled to spring posts 91a and 91b, respectively, which project from the same surface from which pivot posts 92a and 92b project.

Referring to FIGS. 10 through 13 to illustrate another aspect of the present invention, a latch system is provided that includes the pair of latches 80a and 80b, the load ramp 64 which constitutes a first unlatching member, a second unlatching member 102, and the labyrinth seals. Load ramp 64, specifically the distal tip of second portion 72, engages strike plate 82a and protrudes through apertures 98 and 100 so as to be disposed proximate an outer rim of disk 16 to enable loading and unloading of heads 42. Second latching member 102 preferably is a protrusion fixed relative to drive 10 that engages strike plate 82b.

When cartridge 12 is outside of drive 10, the latches 80a and 80b secure top shell 112 and bottom shell 114 together because catches 84a, 84b, 86a, and 86b are inserted into their respective apertures in the cartridge shell. The catches are urged into their respective openings by biasing springs 90a and 90b, which bias strike plates 82 and 82b forward. For example, biasing spring 90a is in tension to urge spring arm 89a rearward (that is, leftward as oriented in FIG. 13), which tends to rotate strike plate clockwise as oriented in FIG. 13.

Upon insertion of cartridge 12 into drive 10, cartridge 10 slides toward rotary actuator 14 and load ramp 64 contacts and engages strike plate 82a through aperture 85a. Load ramp 64 is curved to match the curvature of lifting tab 26. Aperture 85a is therefore correspondingly enlarged to accommodate the projected area of the curvature of load ramp 64 on the front of cartridge 12 (that is, aperture 85a in enlarged to receive the length of ramp 64).

The tip of load ramp 64 urges against strike plate 82a to pivot strike plate rearward (counter-clockwise as oriented in FIG. 13) and to remove catches 84a and 86a from shell apertures 85a and 87a, respectively—thereby unlatching or opening latch 80a. As cartridge 12 moves further toward rotary actuator 14, the distal tip of second latching member 102 contacts and engages strike plate 82b though aperture 85b. Member 102 may have a small profile (compared to that of load ramp 64) and because aperture 85b is only large enough to receive member 102, aperture 85b is smaller than aperture 85a. Member 102 urges against strike plate 82b to open or unlatch latch 80b by urging against biasing spring 90b, in a similar manner as described with respect to latch 80a. Upon the unlatching of latches 80a and 80b, top shell 112 and bottom shell 114 are free to pivot apart about hinge 122.

The combination of the elements of the latch system provides several benefits. For example, the opening in the labyrinth seal formed at the front portions 120a and 120b only at apertures 98 and 100 provides sealing of cartridge 12. Employing load ramp 64 to unlatch one side of the cartridge conserves space within drive 10. The the latch system provides a seal against dust infiltration into cartridge 12 while the cartridge is outside of disk drive 10 (that is, while the latches 80a and 80b secure the cartridge in a closed position as shown in FIG. 11) because the sidewalls 113b and 115b mate together. Deploying the latches proximate the comers (that is, within front portions 120a and 120b) enables the footprint of the cartridge to be minimized, conserves space within the cartridge, and enables the unlatching mechanisms to be simple and disposed at the periphery of the cavity (into which the cartridge is inserted).

It is to be understood, however, that even in numerous characteristics and advantages of the present invention that have been set forth in the foregoing description, together with details of the structure and function of the invention, the disclosure is illustrative only. Further, although an aspect of the present invention has been described as a combination of the latch system components, the present invention encompasses the individual components. For example, the combination of the load ramp and unlatching mechanism; the labyrinth seal geometry; and the latches disposed in the front portions are other aspects of the present invention. Also, changes may be made to detail, especially in matters of shape, size and arrangement of parts within the principles of the invention to the full extent indicated by the broad general meaning of the terms in which the appended claims are expressed.

What is claimed is:

1. A latch system for a removable cartridge disk drive, comprising:
   a removable cartridge having a top shell, a bottom shell, a disk disposed between the top shell and the bottom shell, and a latch for latching together the top shell and the bottom shell, the top shell and the bottom shell pivotable between an open and a closed position about a pivot axis that is substantially perpendicular to an axis of rotation of the disk, the closed position substantially enclosing the disk, the open position enabling access to the disk, the latch including:
   a strike member pivotally coupled to the cartridge, the strike member having a catch that latches together the top shell and the bottom shell; and
   a biasing spring urging the strike member to a closed position; and a load ramp coupled to the disk drive for loading and unloading an actuator arm of the disk drive, the load ramp striking the strike member to unlatch the cartridge in response to the cartridge being inserted into the disk drive.

2. The latch system of claim 1 further comprising a labyrinth seal including a top barrier wall projecting from the top shell and a bottom barrier wall projecting from the bottom shell, the top barrier wall forming a top aperture, the bottom barrier wall forming a bottom aperture, the load ramp extending into each one of the top aperture and the bottom aperture while the cartridge is in an operational position within the disk drive, whereby the labyrinth seal inhibits particle contamination of the disk and enables the load ramp to access the disk.

3. The latch system of claim 2 wherein the latch is a first latch and the latch system further comprises a second latch.

4. The latch system of claim 3 wherein the first latch and the second latch are disposed proximate opposing front sides of the cartridge.

5. The latch system of claim 4 wherein the second latch includes a strike plate, the strike plate of the first latch movable within a first front portion of the cartridge that is defined by the disk and a first front side of the cartridge, and the strike plate of the second latch movable within a second front portion of the cartridge that is defined by the disk and a second front side of the cartridge, whereby space is conserved.

6. The latch system of claim 5 wherein the movable portions of the first latch and the second latch are disposed on the outboard side of the labyrinth seal.

7. The latch system of claim 2 wherein the strike plate is oriented substantially vertically and includes a collar that is pivotally mounted to a pivot post fixed within the cartridge.

8. The latch system of claim 7 wherein the cartridge includes an aperture that receives the catch.

9. The latch system of claim 8 wherein the catch is a first protrusion and the strike plate includes a second protrusion, and the cartridge includes a first aperture and a second aperture, the first protrusion insertable into the first aperture and the second protrusion insertable into the second aperture to latch together the top shell and the bottom shell.

10. The latch system of claim 9 wherein the first protrusion is disposed on a lower portion of the strike plate, the first aperture is formed in the bottom shell, the second protrusion if disposed on the upper portion of the strike plate, and the second aperture is formed on the top shell.

11. A disk drive and removable cartridge combination comprising:
    a removable cartridge having a top shell, a bottom shell, a disk disposed between the top shell and the bottom shell, and a latch for latching together the top shell and the bottom shell, the top shell and the bottom shell pivotable between an open and a closed position about a pivot axis that is substantially perpendicular to an axis of rotation of the disk, the open position enabling access to the disk, the closed position substantially enclosing the disk, the latch including:
    a strike member pivotally coupled to the cartridge, the strike member having a catch that latches together the top shell and the bottom shell; and
    a biasing spring urging the strike member to a closed position; and
    a disk drive including a spindle motor, an actuator, a read/write head disposed on the actuator, and a load ramp coupled to the disk drive for loading and unloading the actuator, the load ramp striking the strike member to unlatch the cartridge in response to the cartridge being inserted into the disk drive.

12. The latch system of claim 11 further comprising a labyrinth seal including a top baniter wall projecting from the top shell and a bottom barrier wall projecting from the bottom shell, the top barrier wall forming a top aperture, the bottom barrier wall forming a bottom aperture, the load ramp extending into each one of the top aperture and the bottom aperture while the cartridge is in an operational position within the disk drive, whereby the labyrinth seal inhibits particle contamination of the disk and enables the load ramp to access the disk.

13. The combination of claim 12 wherein the latch is a first latch and the combination further comprises a second latch.

14. The combination of claim 13 wherein the first latch and the second latch are disposed proximate opposing front sides of the cartridge.

15. The combination of claim 14 wherein the second latch includes a strike plate, the strike plate of the first latch movable within a first front portion of the cartridge that is defined by the disk and a first front side of the cartridge, and the strike plate of the second latch movable within a second front portion of the cartridge that is defined by the disk and a second front side of the cartridge, whereby space is conserved.

16. The combination of claim 15 wherein the movable portions of the first latch and the second latch are disposed on the outboard side of the labyrinth seal.

17. The combination of claim 12 wherein the strike plate is oriented substantially vertically and includes a collar that is pivotally mounted to a pivot post fixed within the cartridge.

18. The combination of claim 17 wherein the cartridge includes an aperture that receives the catch.

19. The combination of claim 18 wherein the catch is a first protrusion and the strike plate includes a second protrusion, and the cartridge includes a first aperture and a second aperture, the first protrusion insertable into the first aperture and the second protrusion insertable into the second aperture to latch together the top shell and the bottom shell.

20. The combination of claim 19 wherein the first protrusion is disposed on a lower portion of the strike plate, the first aperture is formed in the bottom shell, the second protrusion if disposed on the upper portion of the strike plate, and the second aperture is formed on the top shell.

* * * * *

UNITED STATES PATENT AND TRADEMARK OFFICE
CERTIFICATE OF CORRECTION

PATENT NO.   : 6,268,982 B1
DATED        : July 31, 2001
INVENTOR(S)  : Michael C. McGrath et al.

Page 1 of 1

It is certified that error appears in the above-identified patent and that said Letters Patent is hereby corrected as shown below:

Column 1,
Line 51, change "a real" to -- areal --.

Column 2,
Line 8, change " a real" to -- areal --.

Column 6,
Line 34, delete the "period" after the word "extend" - not the end of the sentence Column 9,
Line 50, after "extension" add the number -- 25 --.

Column 14,
Line 33, "banier" should be -- barrier --.

Signed and Sealed this

Ninth Day of April, 2002

Attest:

Attesting Officer

JAMES E. ROGAN
Director of the United States Patent and Trademark Office